United States Patent
Belanger et al.

(10) Patent No.: US 11,136,005 B2
(45) Date of Patent: Oct. 5, 2021

(54) VEHICLE WASH SYSTEM WITH SIDE BRUSHES HAVING THREE OR MORE AXIAL ORIENTATIONS

(71) Applicant: WashMe Properties, LLC, Northville, MI (US)

(72) Inventors: Michael J. Belanger, Northville, MI (US); Barry S. Turner, Novi, MI (US); Michael S. Sayyae, Westland, MI (US); Curtis S. Prater, Warren, MI (US)

(73) Assignee: Belanger, Inc., Northville, MI (US)

( * ) Notice: Subject to any disclaimer, the term of this patent is extended or adjusted under 35 U.S.C. 154(b) by 0 days.

(21) Appl. No.: 16/213,974

(22) Filed: Dec. 7, 2018

(65) Prior Publication Data

US 2019/0176773 A1    Jun. 13, 2019

Related U.S. Application Data

(60) Provisional application No. 62/596,005, filed on Dec. 7, 2017.

(51) Int. Cl.
*B60S 3/06* (2006.01)
*B08B 1/02* (2006.01)
(Continued)

(52) U.S. Cl.
CPC ............... *B60S 3/066* (2013.01); *A46B 7/10* (2013.01); *A46B 13/005* (2013.01); *A46B 13/02* (2013.01); *A46B 15/0004* (2013.01); *B08B 1/002* (2013.01); *B08B 1/02* (2013.01); *B60S 3/042* (2013.01); *B60S 3/06* (2013.01); *B60S 3/063* (2013.01); *B66F 7/0666* (2013.01); *A46B 2200/3046* (2013.01); *B08B 1/04* (2013.01); *B60S 1/00* (2013.01); *B60S 3/002* (2013.01);
(Continued)

(58) Field of Classification Search
CPC ..... B60S 3/06; B60S 3/063; A46B 2200/3046
See application file for complete search history.

(56) References Cited

U.S. PATENT DOCUMENTS 4,354,291 A * 10/1982 Ennis ...................... B60S 3/063
 15/53.3
5,709,002 A * 1/1998 Belanger ................. B60S 3/063
 15/97.3
(Continued)

FOREIGN PATENT DOCUMENTS

EP       0 980 802 A2 *  2/2000

*Primary Examiner* — Randall E Chin
(74) *Attorney, Agent, or Firm* — Dickinson Wright, PLLC

(57) ABSTRACT

A vehicle wash system includes a vehicle treatment area and an overhead frame portion supporting a pair of side brushes. The side brushes are configured to treat the lateral sides of the vehicle and may also treat the front and back of the vehicle. The side brushes are configured to pivot between a vertical position, an outwardly angled position, and inwardly angled position. The side brushes may travel along the side of the vehicle in both the vertical and pivoted orientations. The side brushes may make multiple passes along the side of the vehicle, and the side brushes may change orientation during or between passes to treat different segments of the vehicle. The side brushes may be actively pivoted or may pivot in response to contacting the vehicle when shifted laterally into contact with the vehicle.

38 Claims, 16 Drawing Sheets

(51) Int. Cl.
*B08B 1/00* (2006.01)
*A46B 7/10* (2006.01)
*A46B 13/00* (2006.01)
*A46B 13/02* (2006.01)
*B66F 7/06* (2006.01)
*A46B 15/00* (2006.01)
*B60S 3/04* (2006.01)
*B08B 1/04* (2006.01)
*B64F 5/30* (2017.01)
*B60S 1/00* (2006.01)
*B60S 3/00* (2006.01)
*H02K 9/28* (2006.01)

(52) U.S. Cl.
CPC ................ *B60S 3/004* (2013.01); *B64F 5/30* (2017.01); *H02K 9/28* (2013.01)

(56) References Cited

U.S. PATENT DOCUMENTS 5,715,558 A * 2/1998 Johnson .................. B60S 3/063
15/53.3
2017/0297538 A1* 10/2017 Auer ......................... B08B 1/04

* cited by examiner

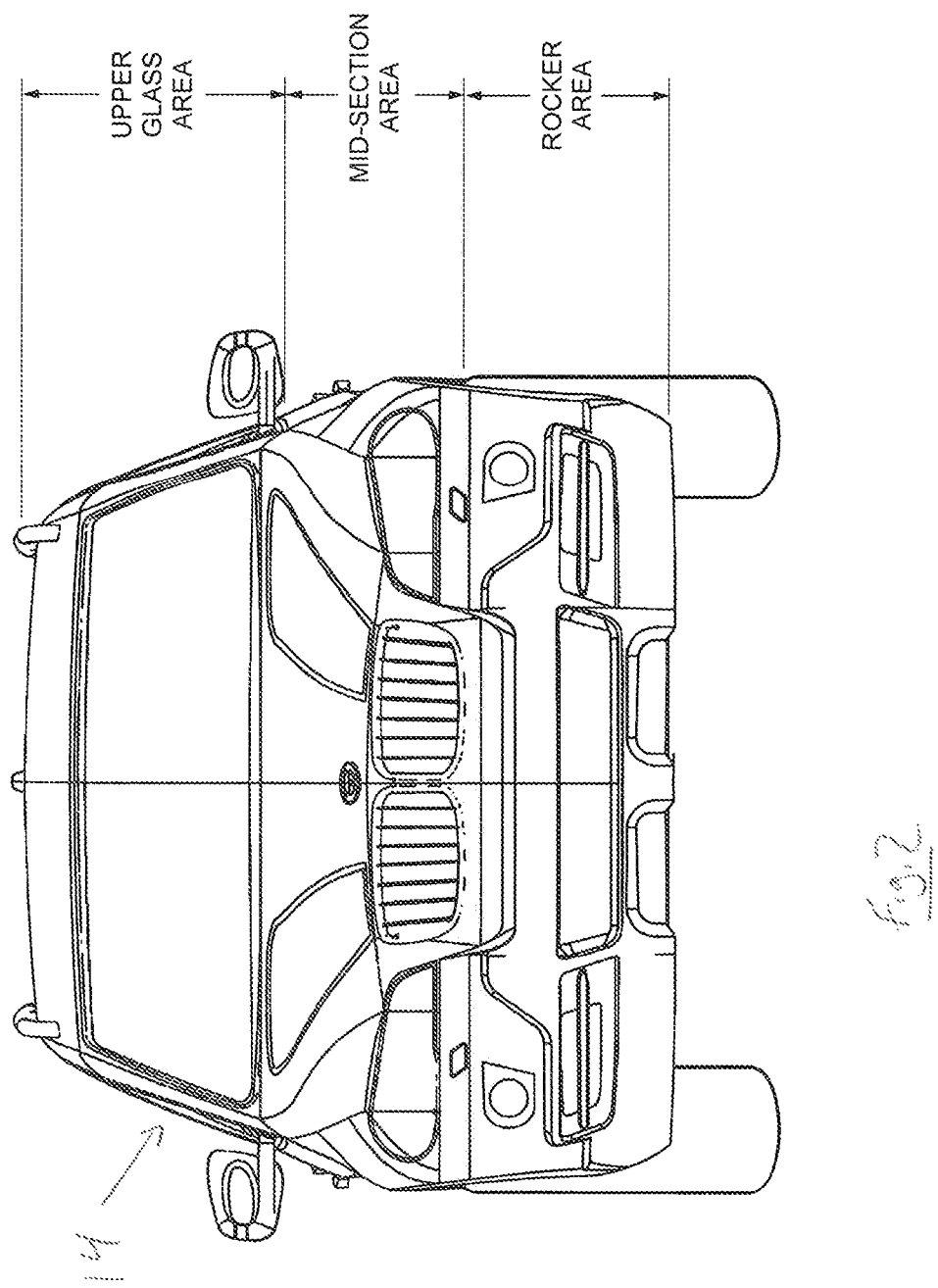

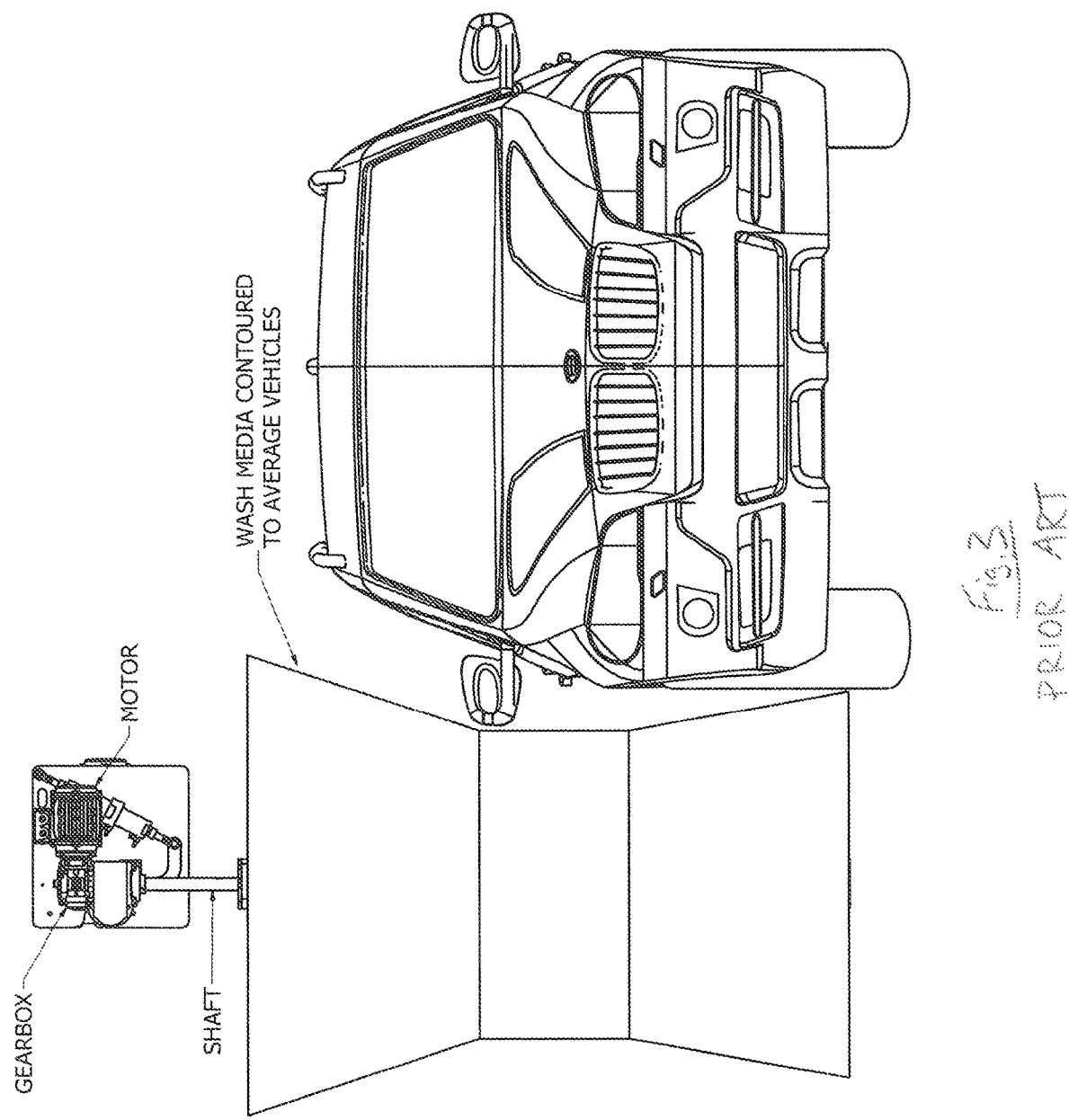

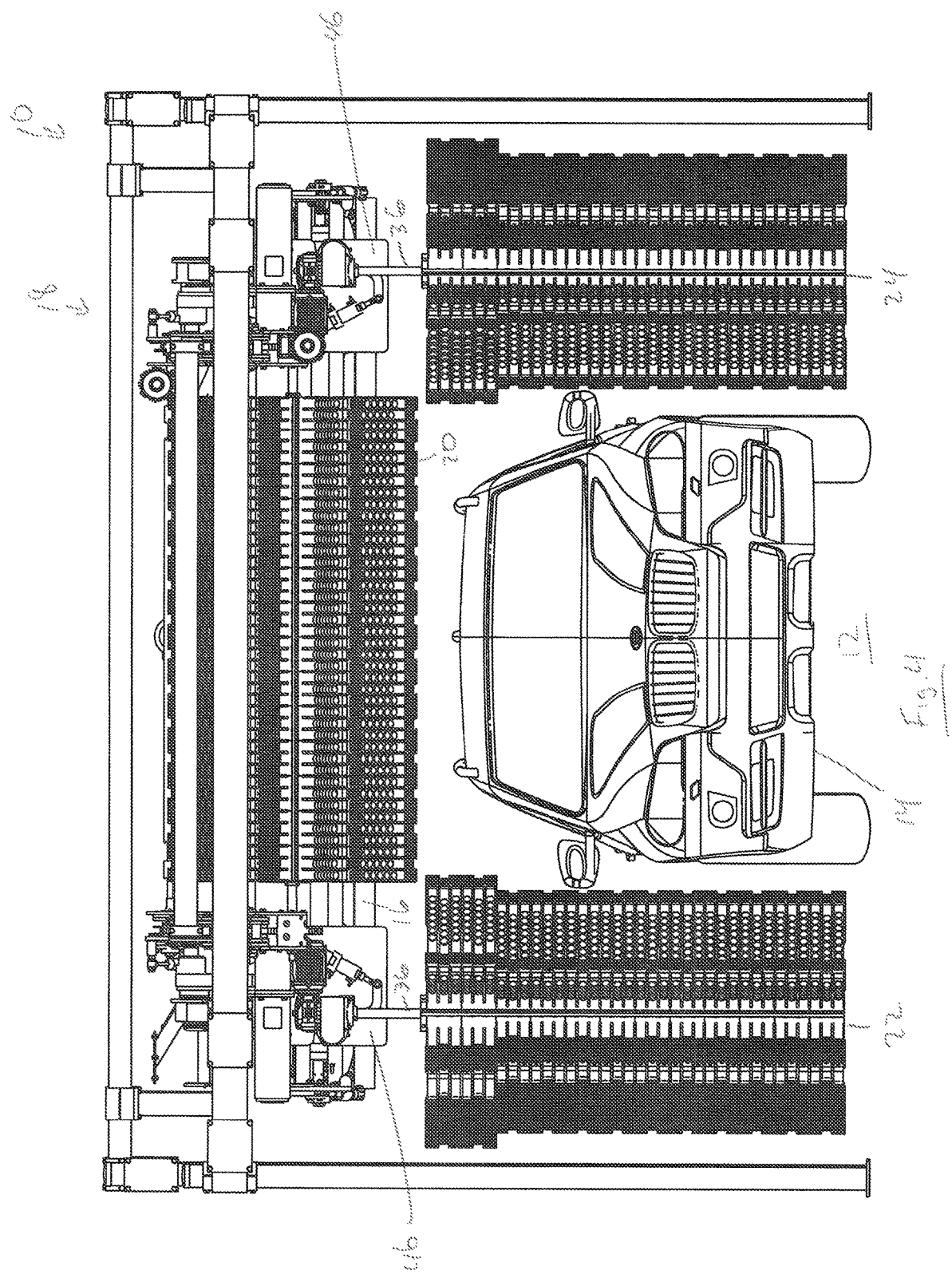

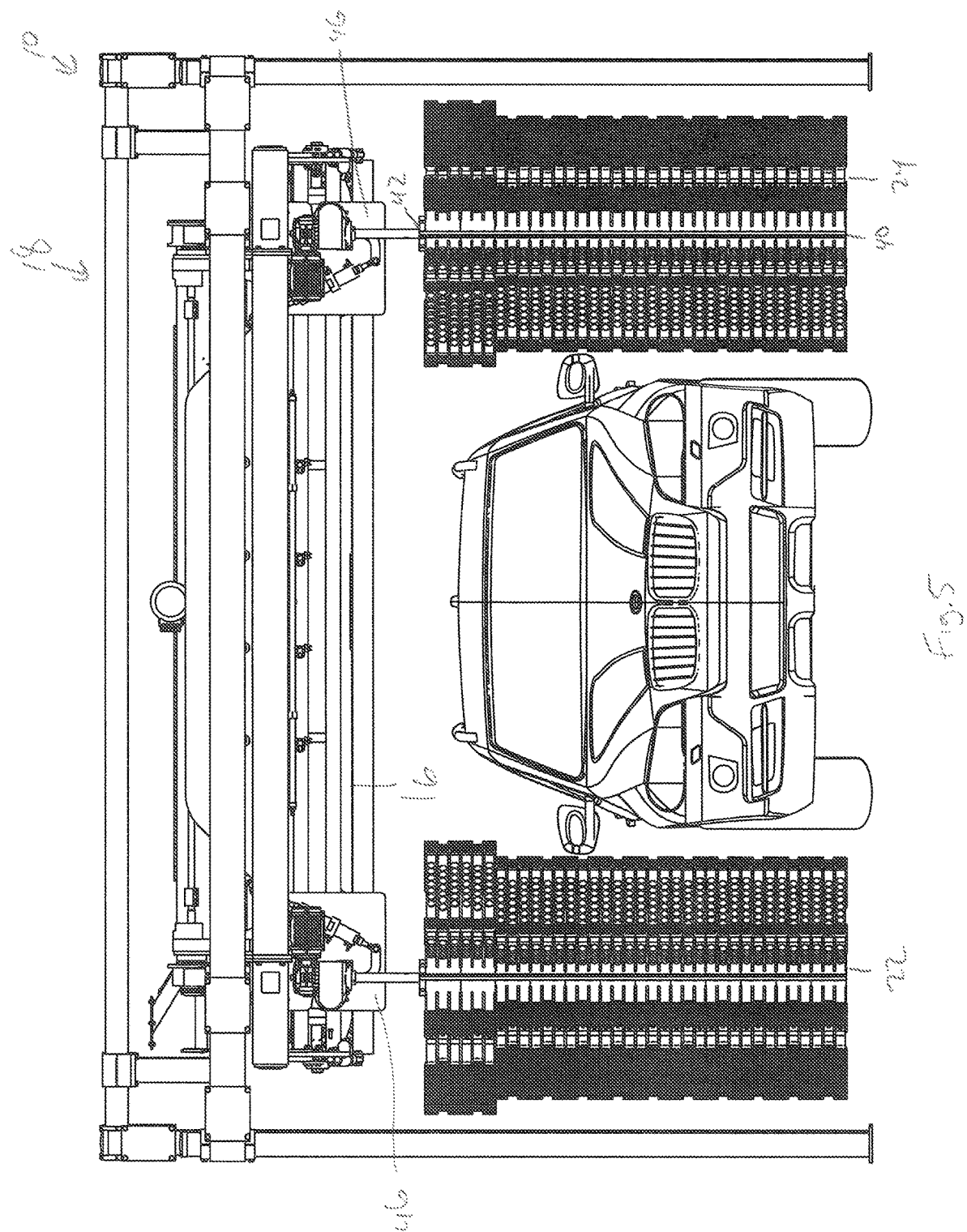

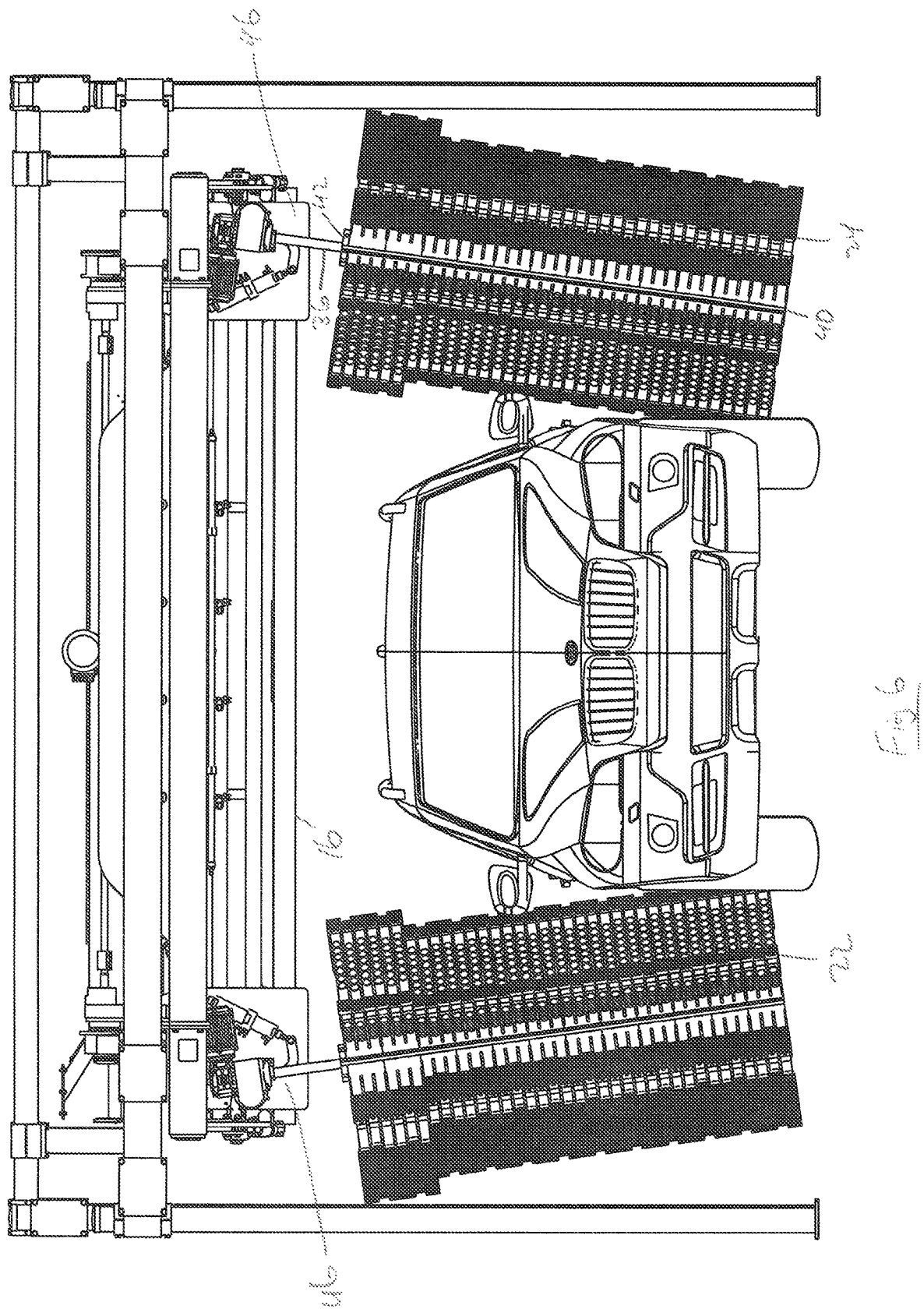

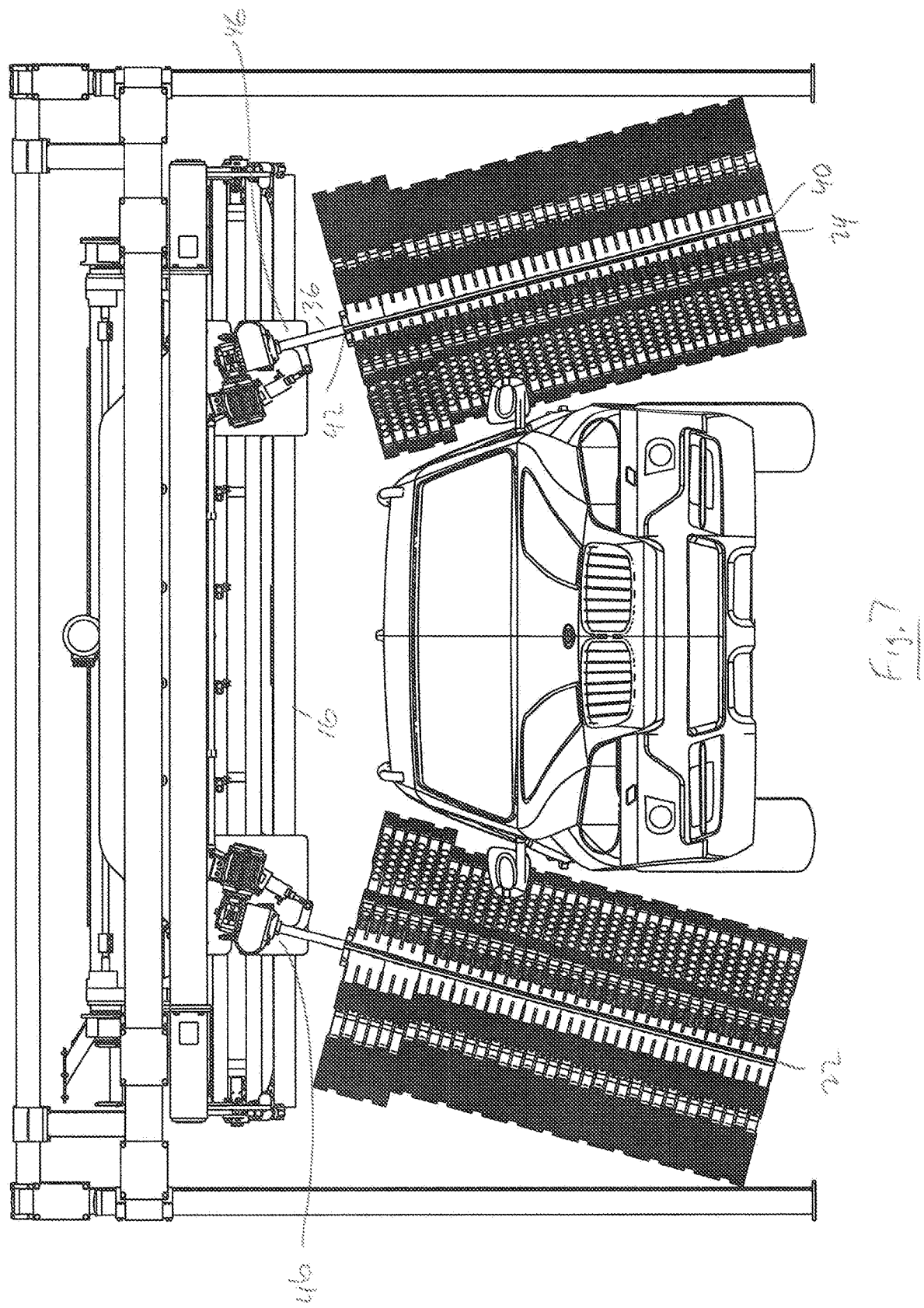

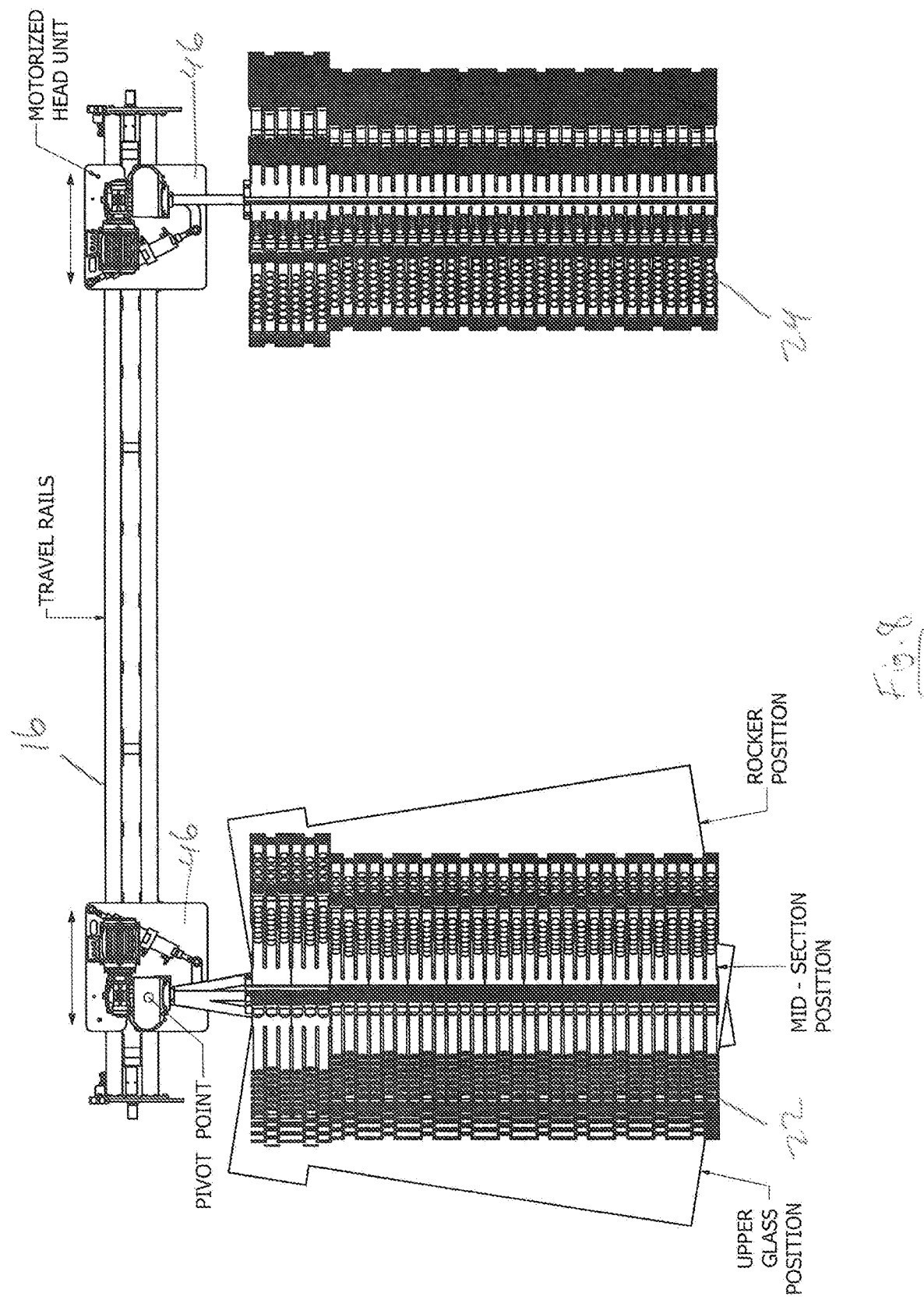

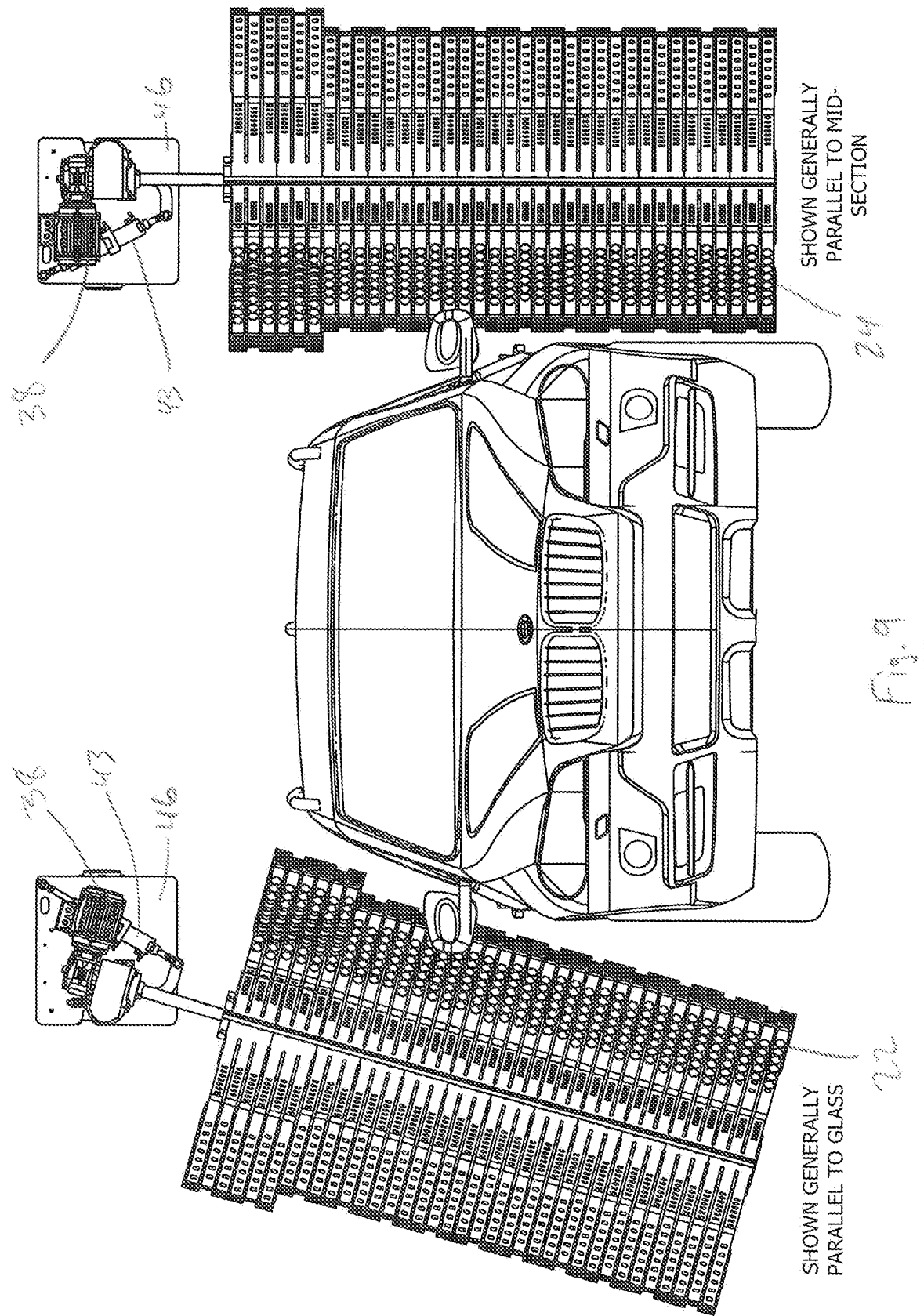

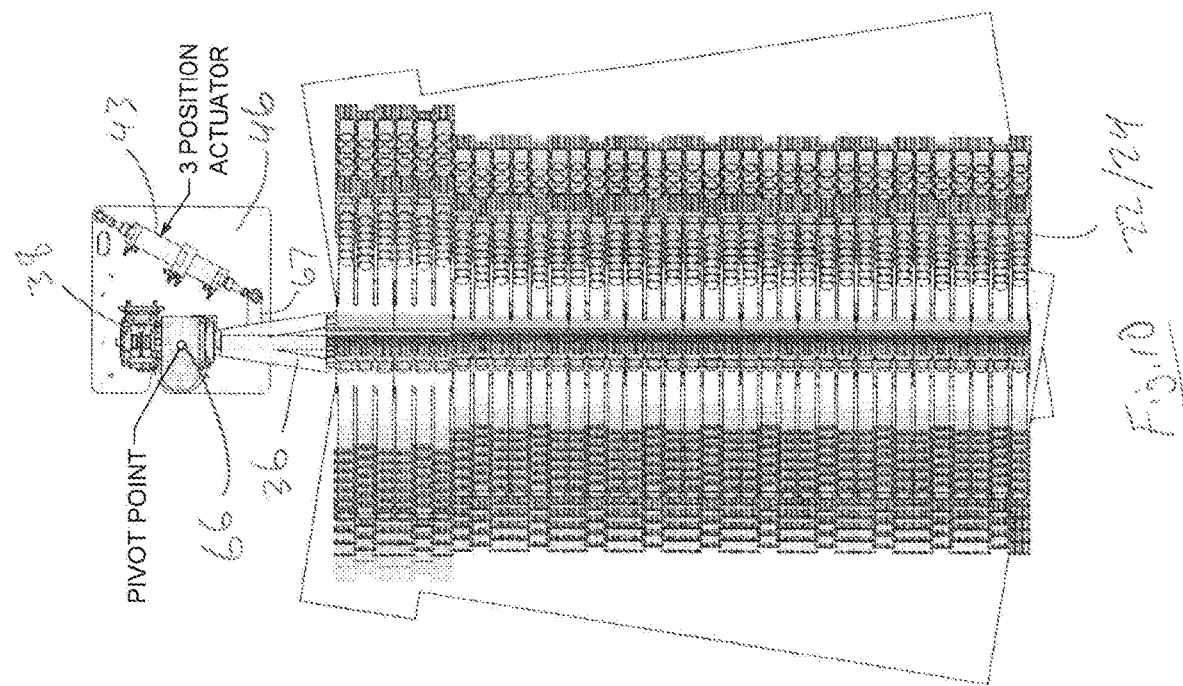

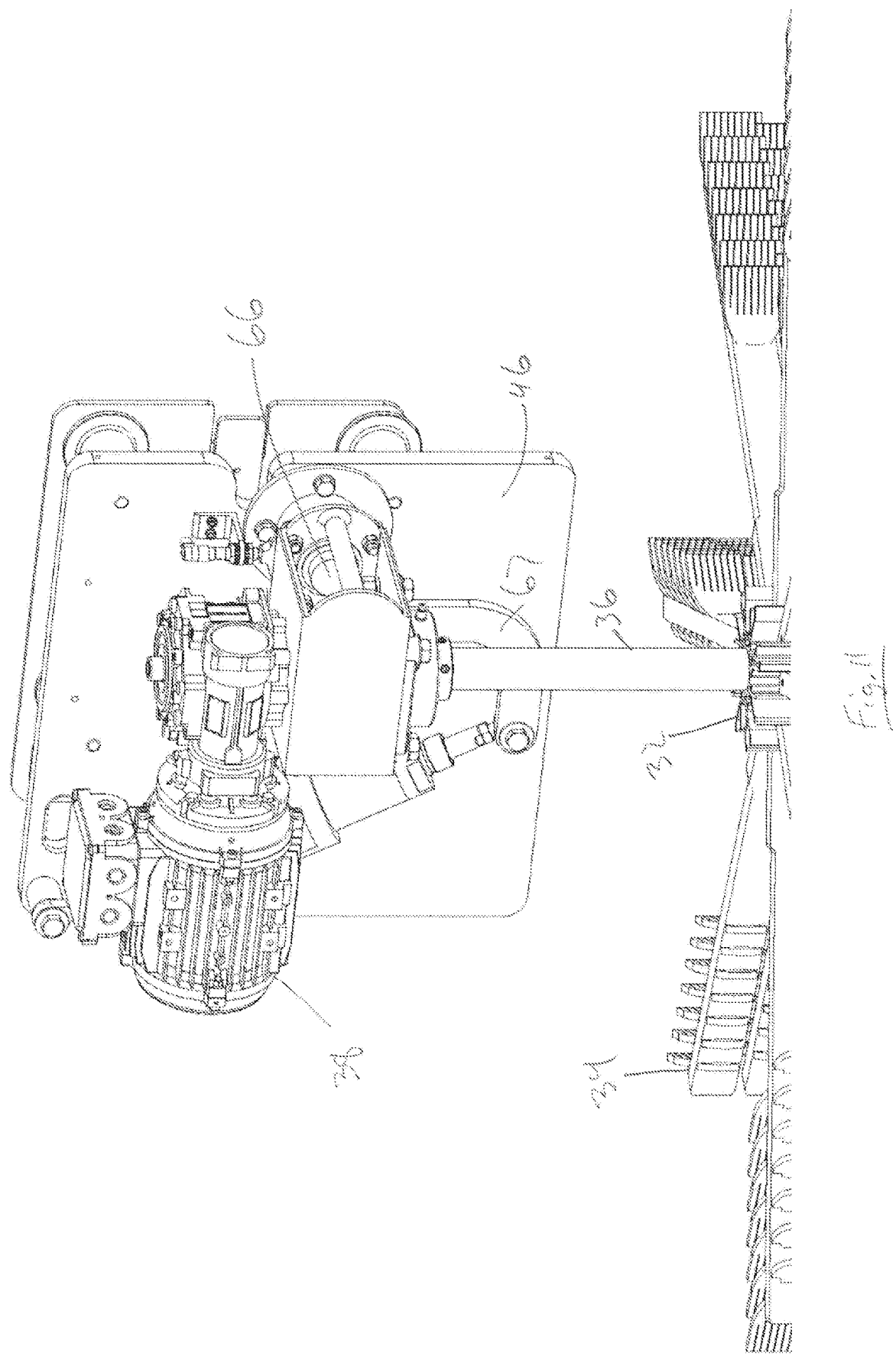

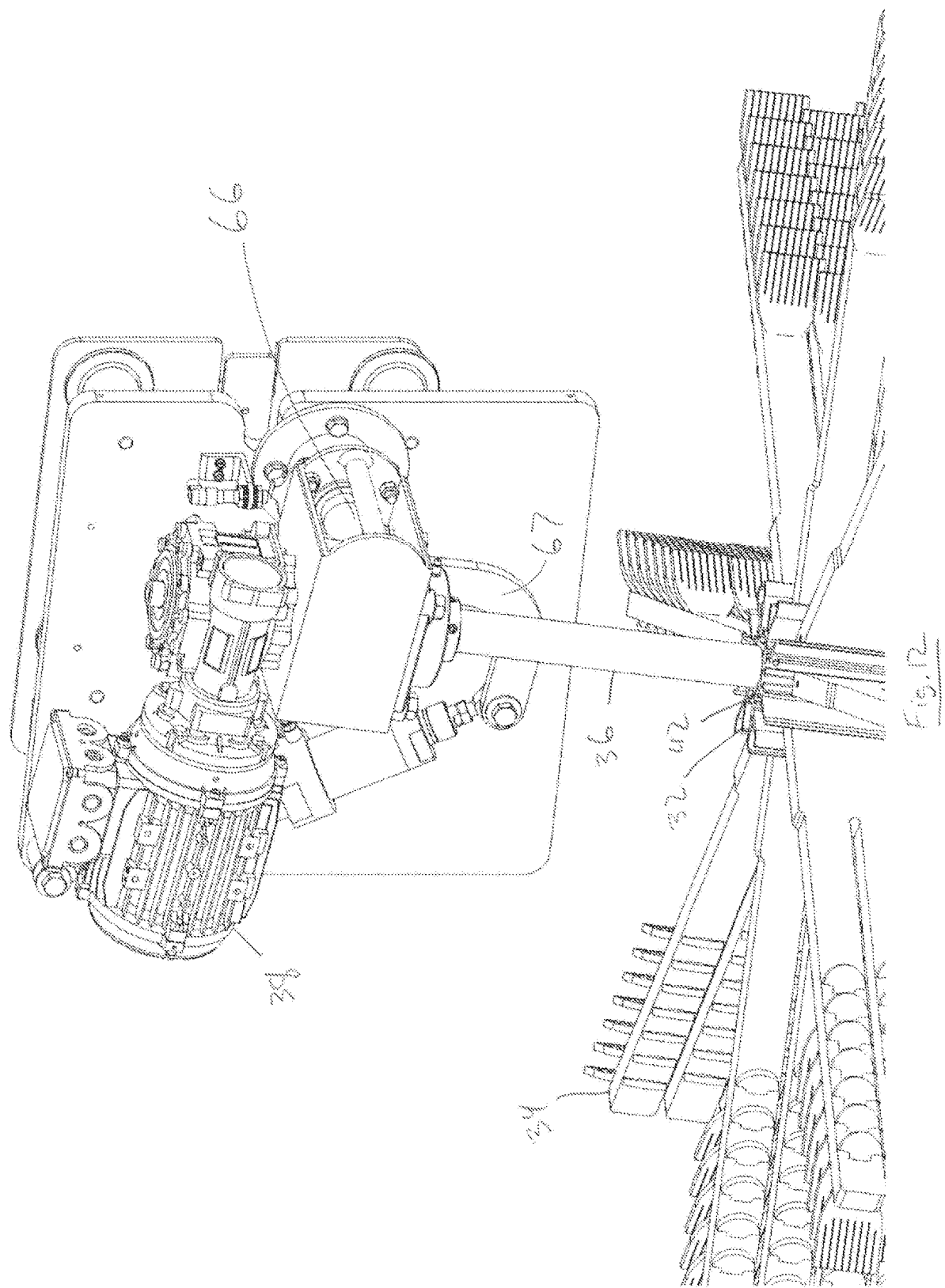

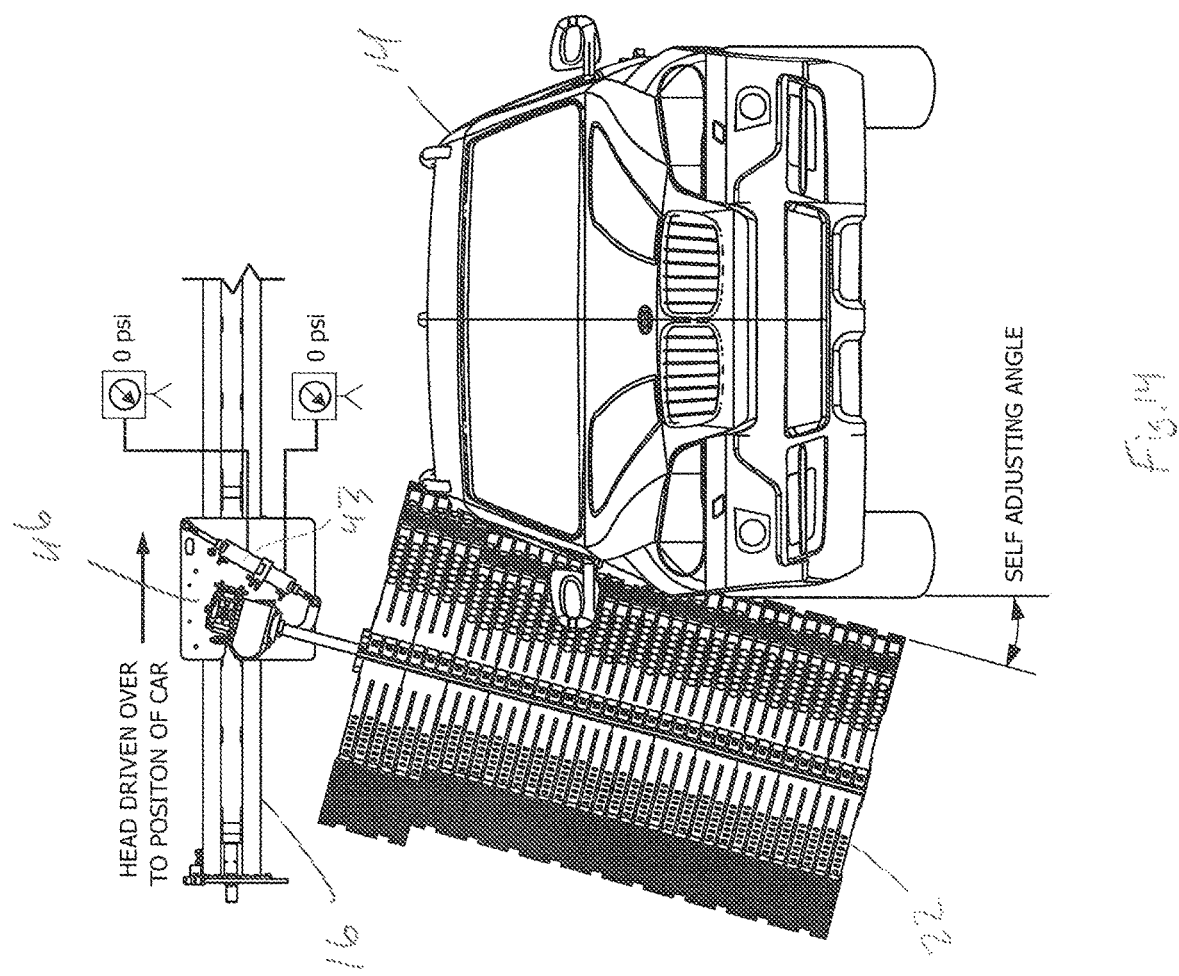

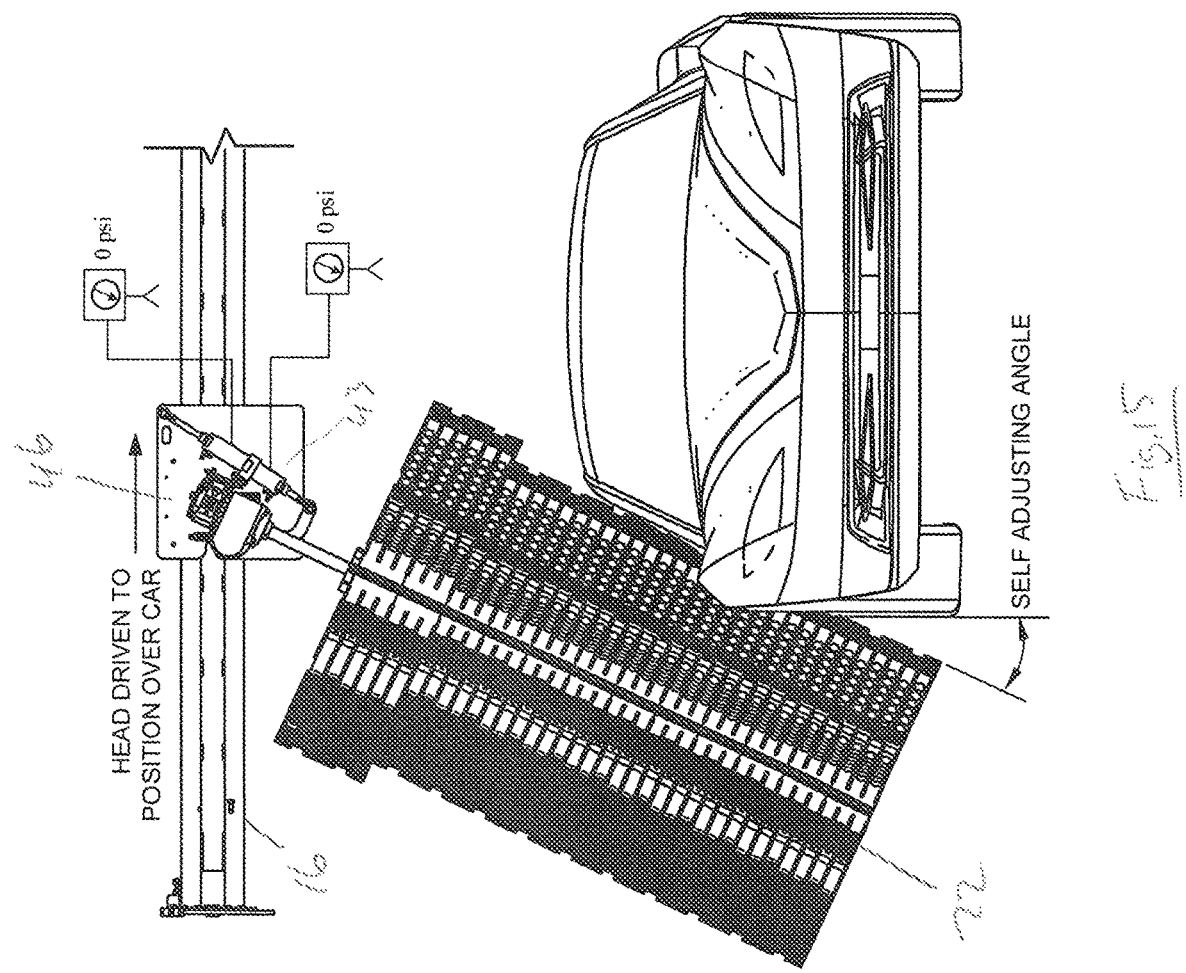

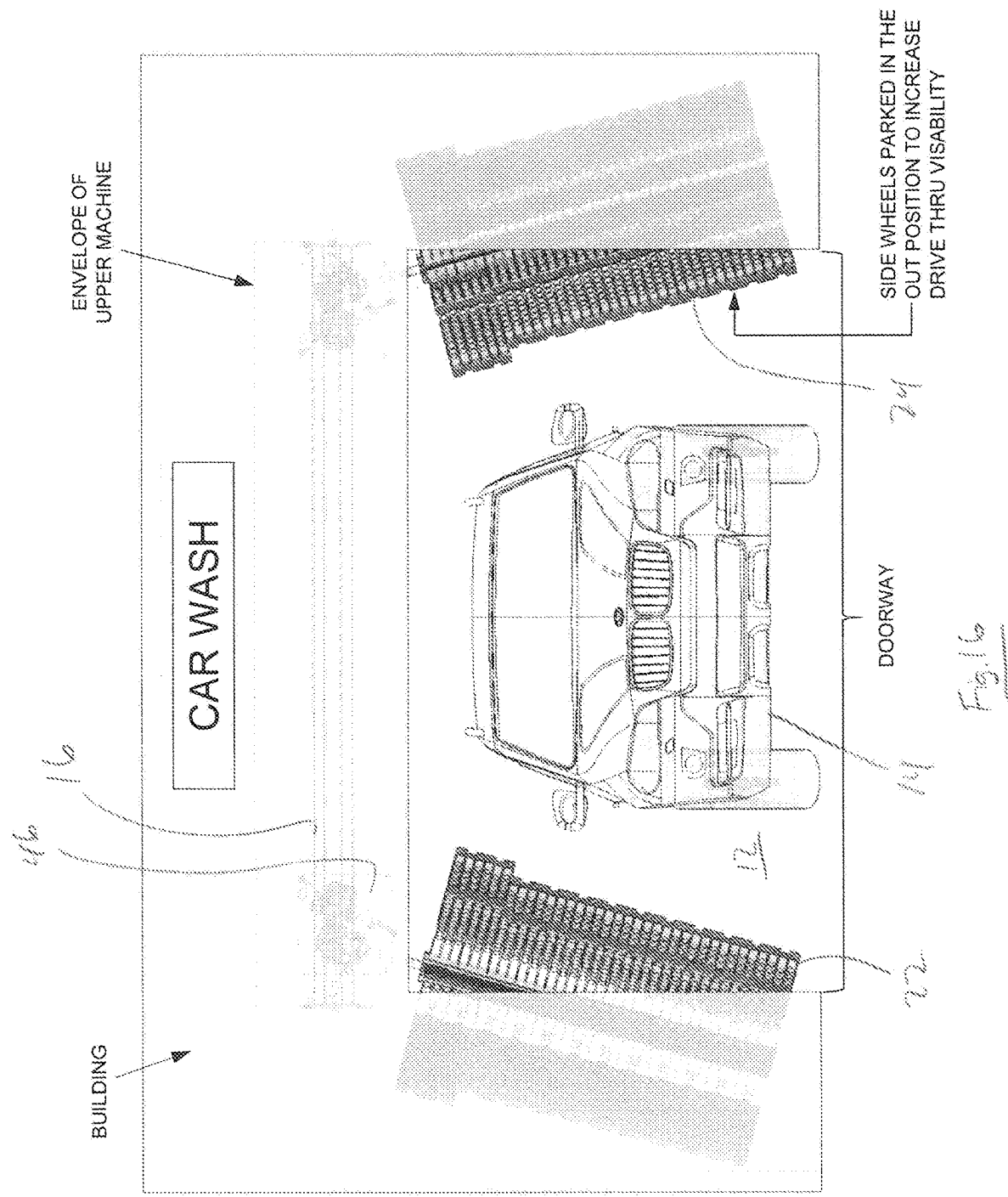

VEHICLE WASH SYSTEM WITH SIDE BRUSHES HAVING THREE OR MORE AXIAL ORIENTATIONS

CROSS-REFERENCE TO RELATED APPLICATIONS

This application claims the benefit of previously filed U.S. Provisional Patent Application No. 62/596,005, filed Dec. 7, 2017, titled "An Improved Rollover Vehicle Wash System," the entire contents of which is hereby incorporated by reference in its entirety.

This application is related to co-filed United States Patent Applications, filed Dec. 7, 2018, with reference made to the TITLE and U.S. Application No., including: VEHICLE WASH SYSTEM HAVING A VERTICALLY OPERATED TOP BRUSH WITH PIVOTING ABILITY, U.S. application Ser. No. 16/213,675 filed Dec. 7, 2018, now U.S. Pat. No. 10,981,547; VEHICLE WASH SYSTEM HAVING A VERTICALLY OPERATED TOP BRUSH WITH COLLAPSIBLE GUIDE TRACK SYSTEM, U.S. application Ser. No. 16/213,605 filed Dec. 7, 2018, now U.S. Pat. No. 11,007,984; VEHICLE WASH SYSTEM WITH SIDE BRUSHES HAVING TWO OR MORE AXIAL ORIENTATIONS, U.S. application Ser. No. 16/213,968 filed Dec. 7, 2018, now U.S. Pat. No. 10,974,700; VEHICLE WASH SYSTEM HAVING A VERTICALLY OPERATED TOP BRUSH WITH A SCISSOR SUPPORT MECHANISM, U.S. application Ser. No. 16/213,733 filed Dec. 7, 2018, now U.S. Pat. No. 10,894,530; VEHICLE WASH SYSTEM WITH PIVOTING SIDE BRUSHES AND METHOD FOR AVOIDING VEHICLE ANTENNA, U.S. application Ser. No. 16/213,983 filed Dec. 7, 2018, now U.S. Pat. No. 10,723,328; VEHICLE WASH SYSTEM WITH PIVOTING SIDE BRUSHES AND METHOD FOR AVOIDING VEHICLE SIDE MIRRORS, U.S. application Ser. No. 16/213,994 filed Dec. 7, 2018, now U.S. Pat. No. 10,710,559; VEHICLE WASH SYSTEM HAVING A MULTI-SPEED CAR WASH BRUSH, U.S. application Ser. No. 16/214,005 filed Dec. 7, 2018, now U.S. Pat. No. 10,759,394, and the entire contents of each of the above listed co-filed applications is hereby incorporated by reference in its entirety.

TECHNICAL FIELD

The present disclosure relates generally to a vehicle wash system for cleaning an exterior surface of a vehicle. More specifically, the present disclosure relates to a vehicle wash system that includes side brushes having two or more axial orientations.

BACKGROUND

Vehicle wash systems are in common use to clean passenger vehicles such as automobiles. These vehicle wash systems may include a number of washing components that can be used to clean different sections of the vehicle. For example, wash systems may include a top brush that cleans the top surfaces of the vehicle and side brushes that clean the side surfaces of the vehicle. The top brush is typically raised and lowered relative to the vehicle to clean the varying heights inherent in the top surfaces of vehicles. The top brush may also be moved fore-and-aft to travel along the length of the vehicle, or the vehicle may be conveyed past the top brush to cover the length of the vehicle. The side brushes, similar to the top brush, may be translated fore-and-aft relative to the vehicle to cover the length of the vehicle, either by translating the brush relative to stationary vehicle, or conveying the vehicle past stationary brushes.

Traditional side brushes may be disposed on ground engaged rails and extend vertically from the rails, and may travel forward and rearward along the side surface of the vehicle to clean the side of the vehicle while rotating about a vertical axis. The side surfaces of vehicles are typically curved in a convex manner, with the side window glass being tilted inward from a middle portion of the body away from the component frame. Similarly, the rocker panels of the vehicle may tilt inwardly at the bottom of the vehicle toward the component frame. Accordingly, a vertical cylindrical shaped brush may be ineffective in cleaning each of these surfaces. In this approach, the brush may not adequately contact and impact the angled top and bottom portions when the middle portion is being properly cleaned. If the brush is moved inward to more effectively contact the angled upper and lower portions, the middle portion of the side surface may be impacted with too much force, which could damage the surface finish or lead to an undesirable increase in noise.

One solution to treat the angled side surfaces of the vehicle is to use side brushes that have a contoured and non-cylindrical profile that tends to correspond to the typical vehicle profile. The brushes may have enlarged diameters at the top and the bottom of the brush, such that they will reach the upper and lower portions. However, these brushes are not specifically tailored to the vehicles, which can lead to an uneven wash. Moreover, the larger diameters result in a greater surface feet per minute contact with the brush at the upper and lower portions, causing a greater impact force on the top and bottom of the vehicle, leading to undesirable increases in noise and potential damage to the vehicle.

Additionally, the increased diameter of the upper portion may extend over the hood or the rear of the vehicle while the middle portion is cleaning the fender areas. Accordingly, the larger diameter portion of the brush may contact the vehicle antenna and damage the vehicle antenna.

In view of the above, there is a need for an improved vehicle wash system.

SUMMARY OF THE DISCLOSURE

It is therefore an aspect of the present disclosure to provide a vehicle wash system with improved cleaning of the side surfaces of different vehicle types.

It is another aspect of the present disclosure to provide a vehicle wash system with improved cleaning abilities.

According to the above and other aspects, a vehicle washing system is provided. The vehicle wash system includes a side brush disposed adjacent a vehicle treatment area, the vehicle treatment area having a vertical height, a longitudinal length, and a lateral width and configured to receive a vehicle to be washed. The side brush defines a central axis about which the side brush rotates, the central axis extending between a top end and a bottom end of the side brush. A brush shaft extends along the central axis and supports the side brush, wherein the orientation of the brush shaft controls the orientation of the side brush. The brush shaft is pivotable between at least three positions including: a first position, wherein the brush shaft is oriented perpendicularly to the longitudinal length of the vehicle treatment area, a second position, wherein the brush shaft is oriented at an oblique angle relative to the first position such that the bottom portion of the brush shaft is disposed laterally outward relative to the top portion of the brush shaft, and a third position, wherein the brush shaft is oriented at an oblique angle relative to the first position such that the bottom portion of the brush shaft is disposed laterally inward relative to the top portion of the brush shaft. A control system is in communication with the brush shaft to effect movement thereof between the first position and the second position in response to a configuration of the vehicle.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 2 illustrates a front view of a vehicle for being washed in the vehicle wash system;

FIG. 3 illustrates a view of a prior art vehicle wash system having a contoured side brush with enlarged upper and lower diameters in accordance with an aspect of the present disclosure;

FIG. 4 illustrates a front view of the wash system, including a top brush oriented horizontally and a pair of side brushes oriented vertically in accordance with an aspect of the present disclosure;

FIG. 5 illustrates a front view of the wash system, with the top brush removed;

FIG. 6 illustrates a front view of the side brushes with both of the brushes being pivoted inwardly in accordance with an aspect of the present disclosure;

FIG. 7 illustrates a front view of the side brushes with both of the brushes being pivoted outwardly in accordance with an aspect of the present disclosure;

FIG. 8 illustrates one side brush with three different positions and another side brush oriented vertically in accordance with an aspect of the present disclosure;

FIG. 9 illustrates one side brush pivoted outward and with an actuator actuated and the other side brush oriented vertically with an actuator in a nominal position in accordance with an aspect of the present disclosure;

FIG. 10 illustrates a single side brush and a three-position actuator in accordance with an aspect of the present disclosure;

FIG. 11 illustrates the actuator in a nominal position in accordance with an aspect of the present disclosure;

FIG. 12 illustrates the actuator in an inwardly pivoted position in accordance with an aspect of the present disclosure;

FIG. 13 illustrates the actuator in an outwardly pivoted position in accordance with an aspect of the present disclosure;

FIG. 14 illustrates a side brush in a pivoted position that is self-adjusting in accordance with an aspect of the present disclosure;

FIG. 15 illustrates a side brush in another pivoted position that is self-adjusting in accordance with an aspect of the present disclosure; and FIG. 16 illustrates the side brushes in an outwardly pivoted position to increase visibility during vehicle pull-through in accordance with an aspect of the present disclosure.

DETAILED DESCRIPTION OF THE DISCLOSURE

Figure 1:
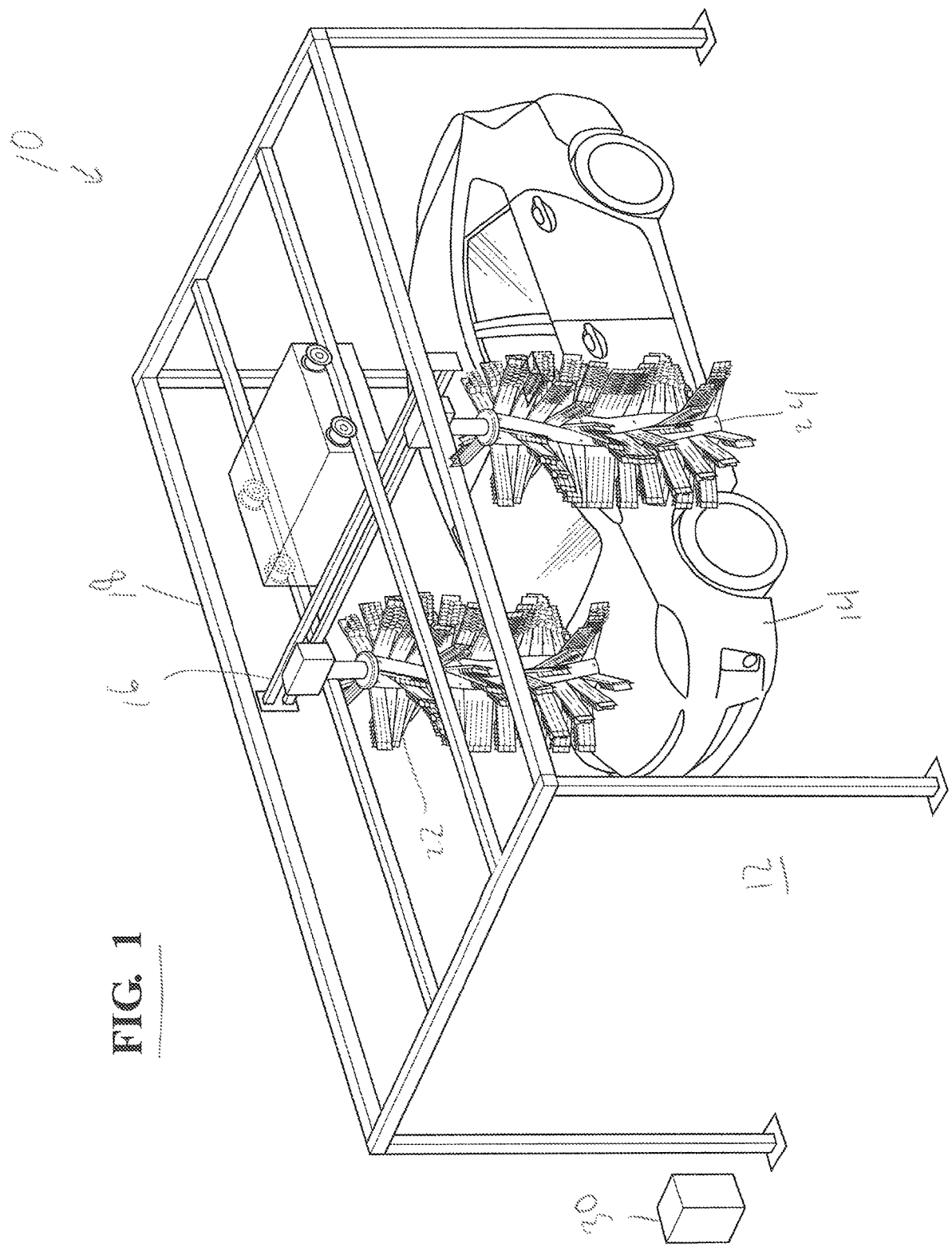
FIG. 1 illustrates a vehicle wash system having an overhead rail structure and a frame supported on the rail structure, with the frame supporting side brushes extending downward.

The present disclosure relates to a vehicle wash system, which may be configured as a rollover type system where the vehicle remains stationary and the various treatment components may be translated and/or moved with respect to the vehicle to perform the vehicle wash process. As is known to one of ordinary skill in the art, a rollover wash system carries various components that treat a vehicle in a predetermined sequence as the rollover wash system makes passes over the length of a vehicle. It will be appreciated that various aspects, components, or portions of the disclosed vehicle wash system may be utilized or employed as part of a conveyor wash system where a vehicle is conveyed past stationary wash components to treat the vehicle exterior as it travels through the wash facility. It will be appreciated that the various aspects, components, or portions of the disclosed vehicle wash system may be employed in connection with a variety of other applications outside of a rollover or conveyor vehicle wash system, such as a manual wash or self-service wash process.

With reference to FIG. 1, according to an aspect, the disclosed vehicle wash system 10 includes a vehicle treatment area 12 where a vehicle 14 is to be positioned in a vehicle wash for treatment thereof. As shown, the wash system 10 can include a frame 16 disposed adjacent the vehicle treatment area 12. According to an aspect, the frame 16 may be supported on an overhead rail system 18 such that the frame 16 may reciprocate forwardly and rearwardly on the overhead rail system 18 in order to travel over the length of the vehicle treatment area 12 and the vehicle 14 therein. According to one aspect, the frame 16 does not travel on ground engaging rails. The frame 16 may also support a plurality of treatment components configured to treat an exterior surface of the vehicle 14. According to an aspect as shown in the Figures, the frame 16 may support a top brush 20 (FIG. 4) oriented generally horizontal to the ground and extending laterally across the vehicle treatment area 12 and disposed for treatment of an upper surface of the vehicle 14. The frame 16 may also support a pair of side brushes 22, 24 configured to travel along and treat either side of a vehicle 14 in the vehicle treatment area 12. The pair of side brushes 22, 24 can be oriented generally perpendicular to the ground, and may be pivoted or canted inwardly/outward to treat different segments of the vehicle 14, as further described below.

The frame 16 may carry a variety of other or different treatment components, such as foam nozzles and fluid nozzles, which can emit foam or high pressure fluid onto both the top and sides of the vehicle 14 in the vehicle treatment area 12. It will further be appreciated that the frame 16 may carry or support a variety of other or different vehicle treatment components. The frame 16 may also have a variety of different configurations and may be supported in a variety of suitable ways. The foam nozzles and the fluid nozzles, and other vehicle treatment components attached to the frame 16 may have a variety of different configurations.

According to an aspect, the disclosed vehicle wash system 10 can provide improved cleaning capabilities without yielding a significant increase in the time of the wash process. According to a further aspect, the disclosed vehicle wash system 10 can provide a decrease in the time required to effectuate a vehicle wash process as compared to prior rollover wash systems. The vehicle wash system 10 can include a control system 30 that is in communication with the frame 16 and the various wash components to effectuate the vehicle cleaning process. According to an aspect, the control system 30 can include an electronic motor controller, a programmable logic controller and a communication network on which all of the components can communicate. According to another aspect, the communication network may be an Ethernet network or a wireless network. It will be appreciated that the control system 30 can include a variety of other components. The control system 30 can thus allow the various components on the system to talk to one another. The control system 30 can also allow for the generation of e-mails and other notifications that can be delivered, including to the operator of the vehicle wash, such as to advise of any faults with the system.

According to a further aspect, the system as an initial step may determine a profile of the vehicle 14 in the vehicle treatment area 12 to be washed. It will be appreciated that this profiling of the geometry of the vehicle 14 may be accomplished in a variety of ways, including by employing a variety of sensors or other detection devices. According to an aspect, the geometric profiling may be accomplished in an initial pass of the frame 16 over the vehicle 14. It will also be appreciated that the geometric profiling can be accomplished in a variety of different ways or by multiple passes of the frame 16 over the vehicle 14. According to a further aspect, the geometric profiling can be accomplished when the vehicle 14 enters the vehicle wash facility or the vehicle treatment area to eliminate a preliminary mapping or profiling pass of the frame.

According to an aspect, once the vehicle exterior has been mapped by the control system 30, it can use this information to dynamically increase the travel speed of the frame 16 along the overhead rail system 18 as appropriate to speed up the wash process. With a roll over wash system, speed of the process is important as, the shorter the wash process, the more processes that can be completed in a given day, which means more revenue for a wash operator.

According to an aspect, with the mapped vehicle exterior, the control system 30 can divide the vehicle into individual segments and then can adjust the position of the top brush 20 and its travel speed as disclosed in more detail in Applicant's concurrently filed patent application entitled "VEHICLE WASH SYSTEM HAVING A MULTI-SPEED CAR WASH BRUSH", which is hereby incorporated by reference as though set forth fully herein. According to an aspect, the control system 30 can vary or adjust the rotational speed of the brushes 22, 24 based on their location with respect to certain vehicle segments. Thus, the linear movement speed of the components and their rotational speed can be dynamically varied depending upon vehicle geometry and other factors. It will also be appreciated that different types of vehicles can have different segments. Exemplary segments can include the following: (i) front fender, (ii) upper glass area; (iii) mid-section area; (iv) rocker area; (v) rear fender; (vi) rear bumper; (vii) rear glass; (viii) front bumper. The control system 30 can obviously take into account a variety of other segments, and can further detected other vehicle geometry such as side mirrors, antennas, ornamentation, or other protruding vehicle elements, which can be avoided during certain passes of the side brushes, 22, 24 if desired.

According to an aspect, and with reference to FIG. 11, each of the side brushes 22, 24 can include a hub portion 32 and a plurality of wash media elements 34 disposed around and in communication with the hub portion 32. Each hub portion 32 may be in communication with a drive axle 36 that is secured to or otherwise coupled to the hub portion 32 to effect rotation thereof. Preferably, the plurality of wash media elements 34 are coupled to or secured to the hub portion 32. The drive axle 36 may be in communication with a power source such as a motor 38. It will be appreciated that a variety of suitable power sources may be employed to effect rotation of the side brushes 22, 24. According to an aspect, the wash media elements 34 may be constructed of an EVA foam and may be generally self-supporting along their length. An exemplary media element is disclosed in U.S. Pat. No. 8,990,993, which is owned by the Assignee of the present application. It will be appreciated that the wash media elements may have a variety of different shapes and configurations and may be constructed from a variety of different materials.

According to an aspect, the power source 38 for each side brush 22, 24 may be in communication with a motor controller, which is in communication with the control system 30. The drive axle 36 can define an axis of rotation and each side brush 22, 24 may be actuated such that the orientation of the axis of rotation of each drive axle 36 may vary as dictated by the control system 30. According to an aspect, the drive axle 36 may be pivoted generally between different discrete positions. In a neutral position, shown in FIGS. 4 and 11, the drive axle 36 may be oriented such that the axis of rotation is generally perpendicular to the ground.

In an outwardly canted position, shown in FIGS. 7 and 13, the drive axle 36 may be oriented or tilted such that the axis of rotation is angled outwardly whereby a lower end 40 of the drive axle 36 is disposed further outwardly from the vehicle treatment area 12 than an upper end 42 of the drive axle 36.

In an inwardly canted position, shown in FIGS. 6 and 12, the drive axle 36 may be oriented or tilted such that the axis of rotation is angled inwardly whereby the lower end 40 of the drive axle 36 is disposed further inwardly from the vehicle treatment area 12 than an upper end 42 of the drive axle 36.

With reference to FIGS. 10-13, the drive axle 36 may be pivoted about a pivot point 66 disposed at an upper end by pivoting the motor assembly 38 and axle 36 with respect to the frame 16. The pivoting may be accomplished by an actuator 43, such as a hydraulic cylinder, which may push or pull on a link 67 that is coupled to the axle 36 and motor 38. A variety of other suitable actuators may be employed. The drive axle 36 may also be pivoted in a variety of other suitable ways. The actuator 43 may be referred to as a multi-position actuator, two-position actuator, three-position actuator, or the like. The actuator 43 may include two hydraulic units or pistons, with one or the other being actuated to cause an inward or outward pivoted position of the side brushes 22, 24. As shown throughout the Figures, the actuator 43 may be a three-position actuator, but it will be appreciated that other actuators may also be used.

According to another aspect, a novel connection of the drive axle 36 to the hub portion 32 is disclosed. Current vehicle wash brushes typically include a hub portion 32 with a hollow interior that can receive a drive axle 36 therethrough. A plurality of intermediate spider portions generally extend between and connect the hub portion 32 to the drive axle 36 to secure and connect them so the hub portion 32 rotates with the drive axle 36 to rotate the attached wash media elements 34. These drive axle/hub portion combinations are very heavy and also expensive due to the amount of material required for a full axle and spider portions. According to an aspect, the hub portion 32 can be formed with a plurality of internal threads that can receive a stub hub in threaded engagement to effect securement and coupling of these structures with the stub hub having corresponding threads. To ensure permanent securement an adhesive such as an aerospace grade adhesive can be employed on the threads of the hub and stub. Additionally, a metal pin can also be employed through the hub portion and the stub hub for further securement. This stub thread arrangement eliminates the need for a full drive axle 36 as well as the intermediate spiders, which provides significant weight, cost, and material savings. In other words, the stub hub terminates at the bottom of the threads and is connected to the hub 32 without spiders. It will be appreciated that a variety of other suitable hub arrangements may be employed.

As will be appreciated, each side brush 22, 24, may be carried on the frame 16 by a carrier support portion 46, which may also be referred to as a head unit or carrier 46, as the frame 16 is linearly translated forwardly and rearwardly over the top of the vehicle 14 such that the side brushes 22, 24 may travel along and engage the side of each vehicle. The carrier 46 may translate laterally inward and outward along the rails of the frame 16 to position the side brushes 22, 24 at the appropriate lateral location depending on the width of the vehicle to be treated and a particular canted or pivoted position of the side brushes 22, 24.

For example, when the side brushes 22, 24 are canted inwardly, the carrier 46 may be moved laterally outward, and when the side brushes 22, 24 are canted outwardly, the carrier 46 may be translated laterally inward. When the side brushes 22, 24 are oriented vertically, the carrier 46 may be disposed laterally between its positions that correspond to the inwardly or outwardly canted positions. FIGS. 4-7 illustrate the different lateral positions of the carrier 46 depending on the pivoted position of the side brushes. FIGS. 4 and 5 show the side brushes 22, 24 in a nominal position. FIG. 6 shows the carrier 46 moved laterally outward when the side brushes 22, 24 are pivoted inwardly. FIG. 7 shows the carrier 46 moved laterally inward when the side brushes 22, 24 are pivoted outwardly.

As will be understood, from a nominal position in which the side brushes 22, 24 are oriented vertically and in contact with the outermost portion of the vehicle 14, if the brushes were canted outwardly, the brushes 22, 24 would move away from the vehicle 14, and therefore moving the carrier 46 inward brings the side brushes 22, 24 back into contact with the side of the vehicle 14. Similarly, if the brushes 22, 24 were canted inwardly, the brushes 22, 24 can impact the vehicle if the carrier 46 does not shift laterally outward.

As the side brushes 22, 24, travel along the side of the vehicle 14 they may be oriented in either the neutral or inwardly/outwardly canted positions. According to an aspect, in a first pass of the frame 16 over the vehicle, the side brushes 22, 24 may be oriented in the neutral position in order to effectively clean generally vertical side surfaces of the vehicle 14. According to still another aspect, in a second pass of the frame 16 over the vehicle the side brushes 22, 24 may be disposed in an outwardly canted position, to effectively engage and clean upper portions of the vehicle sides, such as windows. According to an aspect, the side brushes 22, 24 may be oriented in the inwardly canted position during a further pass of the frame 16 over a vehicle such that a lower portion of each of the side brushes 22, 24 can engage a lower portion of the vehicle sides, such as rocker panels. The brushes 22, 24 are shown throughout the Figures in different canted positions for treating different segments of the vehicle. In many Figures, the brushes 22, 24 are shown not to be in contact with the vehicle, but these illustrations are for clarity, and it will be appreciated that to clean the surfaces of the vehicle 14 that the brushes 22, 24 would indeed be in contact with the surfaces of the vehicle.

Thus, the control system 30 may position the side brushes 22, 24 in different positions with respect to vehicle sides such that with separate passes of the frame 16 over the vehicle 14, the side brushes 22, 24 may clean and engage different portions of a vehicle side surface during the process. It will be appreciated that the control system 30 may orient the side brushes 22, 24 at different angles within each position and particularly the outwardly canted positions. For example, the angle of the outward cant may be larger when the side brush 22 or 24 is engaging the front portion of the vehicle relative to the angle of the outward cant when the side brush 22 or 24 is engaging the window portion of the vehicle. Obviously, the amount of pivot or canting can depend on the vehicle profile. It will further be appreciated that the order of each of those positions for the various passes can vary. For example, the inwardly canted pass, the outwardly canted pass, or the neutral pass may be performed first, second, or third, and may be repeated. In another aspect, the pivot or canting may change during each pass depending on the vehicle segment being treated.

According to still another aspect, when the carrier support portions 46 for the side brushes 22, 24 reach the rear of the vehicle, the carrier support portions 46 may translate the side brushes 22, 24 inwardly along the frame 16 to traverse the rear surfaces of the vehicle 14. The same drive mechanism that shifts the carrier 46 when the brushes 22, 24 are canted may be employed to move the carrier 45 along the rear surface of the vehicle 14. The side brushes 22, 24 may be oriented vertically during this pass along the rear surface. When traversing the rear surface of the vehicle, the side brushes 22, 24 can be tilted into two positions. In one pass of the rear vehicle surface, the drive axle 36 may be oriented in a first position whereby it is generally vertical such that the side brushes are also generally vertical. In a second pass of the rear vehicle surface, the side brushes 22, 24 may be oriented generally outwardly in order to effectively clean a rear vehicle window of the SUV. To achieve this canted position, the frame 16 may be pivoted relative to the rail system 18. To the extent, the control system 30 senses that the vehicle in the vehicle treatment area 12 is a truck or vehicle, the side brushes may only be oriented in a vertical position only for a single pass. It will also be appreciated that according to another aspect, the control system 30 may be configured such that only one side brush 22, 24 traverses the rear portion of the vehicle 14 to effect cleaning.

According to another aspect, the side brushes 22, 24 may also traverse the front surface of a vehicle. However, because most front vehicle surfaces are generally vertical, only a single pass of one or both of the brushes 22, 24 in a generally vertical orientation may be necessary. It will additionally be appreciated that the magnitude of the angles and positions of the brushes along the front, back and side surfaces can vary depending upon the type of vehicle sensed in the vehicle treatment area, i.e., vehicle, truck or SUV.

In another aspect, the front and rear surfaces of the vehicle 14 may be treated by the top brush 20, and the side brushes 22, 24 may remain in laterally outer positions.

The side brushes 22, 24 may have a generally constant diameter, taking into account the lengths of the wash media 34. Put another way, the hub 32 or axle 36 may have a generally constant diameter, and the wash media 34 may have a generally constant length. In this approach, when the brushes 22, 24 are rotated about their axis and the wash media 34 extend outwardly in response to the rotational forces, the profile of the brushes 22, 24 will have a generally constant diameter. The ability of the brushes 22, 24 to tilt between the neutral position relative to the canted positions thereby allows the brushes 22, 24 to contact the varying surface contours of the vehicle. Prior side brushes, such as those shown in FIG. 3, have included upper and/or lower portions with larger or contoured shapes relative to the lower portion to account for the side glass or windows of the vehicle. But these prior brushes would therefore have a different surface speed per minute (SFPM) at the larger portions relative to the smaller portions for a given rotational speed. Accordingly, this could result in increased noise due to the increased SFPM. Reducing the SFPM of the larger portion to reduce the noise would result in an SFPM of the lower portion that is lower than desired. By canting the side brushes 22, 24 with a generally constant diameter, the SFPM may be kept generally consistent for a given rotational speed.

It will be appreciated that the brushes 22, 24 may still have a varying diameter in some cases. For example, as shown in the Figures, the uppermost portion of the brushes 22, 24 has a slightly larger diameter than the remainder of the brush. The slightly larger diameter does not substantially alter the SFPM of the brush, and the ability of the brushes 22, 24 to be canted outwardly allows for the increase in diameter to be limited, unlike the prior art brushes that remained vertical and had to account for various vehicle geometries.

The side brushes 22, 24 may be controllable by the control system 30 in response to mapping the vehicle exterior and determining the vehicle geometry. The control system 30 can therefore determine when to pivot or cant the side brushes 22, 24 and when to position the side brushes 22, 24 vertically based on a position of the side brushes 22, 24 relative to the vehicle 14. For example, at a front portion of the vehicle side surface, the brushes may be oriented vertically. At a middle portion, such as the area where the windows are located, the brushes 22, 24 may be canted, and at a rear portion after passing the windows, the side brushes 22, 24 may be oriented vertically again. However, the side brushes 22, 24 may also remain in one of the neutral or canted positions throughout the length of the pass, and multiple passes may be made to contact multiple surfaces of the vehicle. It will be appreciated that there are various combinations of pivoting and numbers of passes that may be employed for different vehicle shapes.

In one aspect, even when multiple passes are made as described above, the side brushes 22, 24 may be oriented vertically during the canted pass in areas where canting is not necessary, such as the front and rear. Alternatively, the canted pass may be limited to the area where canting is necessary.

During operation of the side brushes 22, 24, the control system 30 may receive position feedback from the side brushes 22, 24 to determine when to cant the brushes 22, 24 and when to shift the brushes 22, 24 based on the detected vehicle contour. The control system 30 can therefore accurately position the side brushes 22, 24 to provide an optimal washing operation, and can achieve high washing accuracy without requiring more complicated torque control feedback.

The angles of the pivoting and canting may vary depending on the vehicle geometry. The inward canting may be at a different angle that the angle used for the outward canting, or the angle of canting may vary during a pass or between passes.

The canting angles, for both the inward canting and outward canting may be preset based on detected generic vehicle body type, or may be adjusted based on the body shape of the specific vehicle. For example, if a sedan is detected, the outward cant angle may be greater than if a SUV is detected. Alternatively, the canting angles may be preset and applied regardless of the vehicle body type, with a cant angle selected that is effective for a range of window angles and rocker areas.

With reference to FIGS. 14 and 15, the canting angle of the outwardly canted orientation may also be self-adjusted based on the shape of the vehicle being treated, and without a specific controlled angle. The self-adjusted outwardly canted position may be achieved in response to shifting the carrier 46 laterally inward along the rails of the frame 16. For example, the carrier 46 maybe moved inwardly over the top of the vehicle 14, and the brush 22, 24 may contact the side of the vehicle 14, causing the brush 22, 24 to pivot relative to the carrier 46. In this approach, the actuator 43 may be set to an inactive state, in which the pistons of the actuator may freely move within their housing. Put another way, the brushes 22, 24 may be free to swing relative to their pivot point 66 at the carrier 46. FIGS. 14 and 15 show two different outwardly canted positions based on different types and shapes of the vehicle 14 being treated. FIG. 15 is pivoted more than FIG. 14. The actuator 43 is illustrated as being at 0 psi.

In yet another aspect, as shown in FIG. 16, the outwardly canted orientation may be used at a beginning and/or ending stage of the washing process, in which the brushes 22, 24 are outwardly canted prior to the vehicle 14 entering the vehicle treatment area 12 or after treatment is concluded. In this approach, the brushes 22, 24 are "opened" to increase the drive through visibility of the wash system 10. Once the vehicle is in position to be washed, the brushes 22, 24 may be adjusted to one of the other orientations and positioned into engagement with the vehicle 14 as described above. When the treatment is complete, the brushes 22, 24 may be canted outwardly as the vehicle 14 exits. This outward canting may be performed with or without the carriers 46 being moved further outward.

In the above description, the vehicle 14 remained stationary within the vehicle treatment area 12. However, it will be appreciated that the above described movement and pivoting of the side brushes 22, 24 relative to the vehicle body 14 may still occur even if the vehicle 14 is being conveyed. The side brushes 22, 24 may still be controlled to be pivoted based on the relative movement between the vehicle 14 and the brushes 22, 24 that defines the passes.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A vehicle washing system, comprising:
   a side brush disposed adjacent a vehicle treatment area, the vehicle treatment area having a vertical height, a longitudinal length, and a lateral width and configured to receive a vehicle to be washed, the side brush defining a central axis about which the side brush rotates, the central axis extending between a top end and a bottom end of the side brush;
   a brush shaft extending along the central axis and supporting the side brush, wherein the orientation of the brush shaft controls the orientation of the side brush;
   the brush shaft being pivotable between at least three positions including:
      a first position, wherein the brush shaft is oriented perpendicularly to the longitudinal length of the vehicle treatment area,
      a second position, wherein the brush shaft is oriented at an oblique angle relative to the first position such that the bottom portion of the brush shaft is disposed laterally outward relative to the top portion of the brush shaft, and
      a third position, wherein the brush shaft is oriented at an oblique angle relative to the first position such that the bottom portion of the brush shaft is disposed laterally inward relative to the top portion of the brush shaft; and
   a control system in communication with the brush shaft to effect movement thereof between the first position, the second position, and the third position in response to a configuration of the vehicle;
   wherein, in response to signals from the control system, the side brush contacts an upper portion of the vehicle in the second position, a lower portion of the vehicle in the third position, and a middle portion of the vehicle in the first position.

2. The system of claim 1 further comprising:
   a frame disposed adjacent the vehicle treatment area and configured for supporting vehicle treatment components; and
   the side brush being pivotally coupled to the frame in a position to engage a vehicle in the vehicle treatment area.

3. The system of claim 2, wherein the frame is supported by an overhead rail system, and the frame is movable in a longitudinal direction relative to the rail system.

4. The system of claim 2, further comprising:
   a carrier portion coupled to the frame and the side brush, wherein the carrier portion is translatable laterally relative to the frame and the frame is translatable longitudinally relative to the vehicle treatment area, wherein the carrier portion translates longitudinally along with the frame and the side brush translates laterally along with the carrier portion, wherein the pivot point of the side brush is longitudinally outside of the carrier.

5. The system of claim 4, wherein when the side brush is in the second position the carrier portion is shifted laterally inward relative to the first position.

6. The system of claim 5, wherein the side brush moves from the first position to the second position when the side brush is non-actuated and in response to translating the carrier portion laterally inward and in response to the side brush contacting an angled surface of the vehicle.

7. The system of claim 5, wherein the side brush moves from the first position to the second position in response to actuation from an actuator and independent of contact with the vehicle.

8. The system of claim 4, wherein the side brush is pivoted outward and shifted laterally outward and disengaged with the vehicle for providing clearance for the vehicle to enter or exit the vehicle treatment area.

9. The system of claim 2, wherein the system includes vehicle sensors in communication with the controller, the sensors configured to detect a configuration of the vehicle prior to contacting the vehicle with the side brush.

10. The system of claim 9, wherein the vehicle sensors are attached to the frame, and the sensors move with the frame to detect the configuration of the vehicle.

11. The system of claim 10, wherein the vehicle sensors are fixed relative to the vehicle treatment area.

12. The system of claim 1, wherein, in the first position, a pivot point of the side brush is positioned a first lateral location, in the second position, the pivot point is positioned at a second lateral location that is different than the first lateral location, and, in the third position, the pivot point is positioned at a third lateral location that is different than the first and second lateral locations.

13. The system of claim 1, wherein, the side brush includes a first longitudinal location relative to the vehicle and a second longitudinal location relative to the vehicle.

14. The system of claim 13, wherein the side brush is in the first position in both the first and second longitudinal locations.

15. The system of claim 13, wherein the side brush is in the second position in both the first and second longitudinal locations.

16. The system of claim 13, wherein the side brush is in the third position in both the first and second longitudinal locations.

17. The system of claim 1, further comprising feedback sensors in communication with the control system, wherein the feedback sensors detect a position of the brush relative to the vehicle.

18. The system of claim 1, wherein the side brush includes a plurality of media wash elements extending radially outward from the brush shaft, wherein when the plurality of media wash elements are fully extended radially outward the media wash elements define an outer diameter of the side brush.

19. The system of claim 18, wherein the outer diameter of the side brush is generally constant along a majority of its length.

20. A method for treating a vehicle body in a vehicle washing system, the method comprising:
provide a vehicle having a vehicle body within a vehicle treatment area of a vehicle washing system, wherein the vehicle treatment area has a vertical height, a longitudinal length, and a lateral width;
positioning a side brush in a first orientation vertically within the vehicle treatment area, wherein the side brush rotates about a central shaft thereof that is supported by an overhead frame;
contacting a vertically oriented portion of the vehicle body with the side brush when the side brush is in the first orientation;
pivoting the side brush into a second orientation about a pivot point disposed at a top portion of the side brush, and orienting the side brush at an oblique angle relative to the vertical axis, wherein a bottom portion of the side brush is disposed laterally outward relative to the top portion of the side brush;
contacting an angled portion of the vehicle body with the side brush when the side brush is in the second orientation;
pivoting the side brush into a third orientation about a pivot point disposed at a top portion of the side brush, and orienting the side brush at an oblique angle relative to the vertical axis, wherein a bottom portion of the side brush is disposed laterally inward relative to the top portion of the side brush;
contacting a lower portion of the vehicle body with the side brush when the side brush is in the third orientation;
during contact between the side brush and the vehicle, positioning the side brush in the first orientation, the second orientation, and the third orientation on the same lateral side of the vehicle;
detecting an exterior configuration of the vehicle; and
controlling the position of the side brush in either the first orientation or the second orientation in response to a detected exterior configuration of the vehicle.

21. The method of claim 20, further comprising translating the side brush longitudinally along a side portion of the vehicle body.

22. The method of claim 21, wherein the side brush is in the first orientation during the translating of the side brush.

23. The method of claim 21, wherein the side brush is in the second orientation during the translating of the side brush.

24. The method of claim 21, wherein the side brush moves between the first orientation and the second orientation during the translating.

25. The method of claim 21, wherein the side brush is in the third orientation during the translating of the side brush.

26. The method of claim 20, further comprising translating the side brush laterally along a front or rear portion of the vehicle body.

27. The method of claim 20, further comprising detecting, via sensors in communication with a controller, a vehicle body configuration prior to contacting the vehicle with the side brush.

28. The method of claim 27, further comprising translating the sensors relative to the vehicle body.

29. The method of claim 28, wherein the sensors pass over the vehicle body when the vehicle body is stationary.

30. The method of claim 28, wherein the vehicle body passes under the sensors when the sensors are stationary.

31. The method of claim 27, further comprising determining, via a controller, a location of the vehicle body to avoid with the side brush, and moving the side brush away from the vehicle body at the location of the vehicle body to avoid.

32. The method of claim 27, further comprising determining, via a controller, vertical portions of the vehicle and angled portions of the vehicle, and controlling the orientation of the side brush depending on the position of the side brush relative to the vertical portions and angled portions.

33. The method of claim 20, wherein the translating the side brush longitudinally along a side portion of the vehicle body includes translating the side brush in a first longitudinal direction with the side brush in the first orientation and translating the side brush in a second longitudinal direction that is opposite the first longitudinal direction with the side brush in the second or third orientation.

34. The method of claim 20, further comprising receiving, at a controller, feedback from the side brush and adjusting the position and/or orientation of the side brush relative to the vehicle in response to receiving the feedback.

35. The method of claim 20, further comprising translating the pivot point laterally inward and, in response thereto, contacting an angled surface of the vehicle and, in response to contacting the angled surface of the vehicle, pivoting the side brush into the second orientation.

36. The method of claim 20 further comprising positioning the side brush in the second orientation prior to providing the vehicle in the vehicle treatment area.

37. The method of claim 20, wherein the translating the side brush longitudinally along a side portion of the vehicle body includes translating the side brush in a first pass, a second pass, and a third pass, wherein the side brush is in the first position during the first pass, in the second position during the second pass, and in the third position during the third pass.

38. A vehicle washing system, comprising:
a side brush disposed adjacent a vehicle treatment area, the vehicle treatment area having a vertical height, a longitudinal length, and a lateral width and configured to receive a vehicle to be washed, the side brush defining an axis about which the side brush rotates, the axis extending between a top portion and a bottom portion of the side brush;
a brush shaft extending along the central axis and supporting the side brush, wherein the orientation of the brush shaft controls the orientation of the side brush;
the side brush being pivotable between at least three positions including a first position, wherein the side brush is oriented generally vertically, a second position, wherein the side brush is pivoted relative to the first position such that the bottom portion of the side brush is disposed laterally outward relative to the top portion of the side brush, and a third position, wherein the side brush is pivoted relative to the first position such that the bottom portion of the side brush is disposed laterally inward relative to the top portion of the side brush;

wherein the side brush contacts an upper portion of the vehicle in the second position, a lower portion of the vehicle in the third position, and a middle portion of the vehicle in the first position.

\* \* \* \* \*